United States Patent
Huang

(10) Patent No.: US 6,829,829 B1
(45) Date of Patent: Dec. 14, 2004

(54) GARDENING PRUNER PROVIDED WITH MEANS TO EFFECTUATE EFFICIENT TRANSMISSION OF FORCE FROM HANDLES TO BLADES THEREOF

(76) Inventor: Yao-Chung Huang, No. 2, Alley 1, Lane 722, Sec. 4, Yen Hai Rd., Fu Shing Hsiang, Chang Hua Hsien (TW)

( * ) Notice: Subject to any disclaimer, the term of this patent is extended or adjusted under 35 U.S.C. 154(b) by 0 days.

(21) Appl. No.: 10/326,931

(22) Filed: Dec. 23, 2002

(51) Int. Cl.⁷ ................................................. B26B 13/00
(52) U.S. Cl. .............................. 30/252; 30/193; 30/245
(58) Field of Search ........................... 30/252, 245, 254, 30/192, 193, 248, 250; 81/415, 416; 606/174, 175

(56) References Cited

U.S. PATENT DOCUMENTS

| | | | | |
|---|---|---|---|---|
| 476,459 A | * | 6/1892 | Hamann et al. | 30/252 |
| 632,627 A | * | 9/1899 | Johnson | 30/250 |
| 3,273,238 A | * | 9/1966 | Kuhbier | 30/189 |
| 4,130,938 A | * | 12/1978 | Uhlmann | 30/192 |
| 6,345,446 B1 | * | 2/2002 | Huang | 30/250 |

* cited by examiner

*Primary Examiner*—Douglas D. Watts
(74) *Attorney, Agent, or Firm*—Alan D. Kamrath; Nikolai & Mersereau, P.A.

(57) ABSTRACT

A gardening pruner comprises two handles, two blades, two pivoting plates, and two actuating plates. The actuating plates are fastened at a bottom end with the handles and are provided at a top end with a toothed portion. The two actuating plates are pivoted together with the two pivoting plates by a pivot. The two blades are provided at a bottom end with a toothed portion and are pivoted together with the two pivoting plates by another pivot such that the toothed portions of the two blades are respectively engaged with the toothed portions of the two actuating plates, thereby resulting in a gear-type transmission of force from the handles to the blades.

2 Claims, 4 Drawing Sheets

GARDENING PRUNER PROVIDED WITH MEANS TO EFFECTUATE EFFICIENT TRANSMISSION OF FORCE FROM HANDLES TO BLADES THEREOF

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates generally to a gardening implement, and more particularly to a gardening pruner comprising two handles, two blades, and a mechanism enabling an efficient transmission of force from the two handles to the two blades.

BACKGROUND OF THE INVENTION

There are a variety of conventional gardening pruners, which are all inefficient in terms of transmission of force from the handles to the blades. As a result, the conventional gardening pruners are conceivably burdensome to use to prune the garden plants.

BRIEF SUMMARY OF THE INVENTION

The primary objective of the present invention is to provide a gardening pruner comprising two handles, two blades, two pivoting plates, two actuating plates, and two link pieces. The two handles are fastened with the two blades in conjunction with the two pivoting plates, two actuating plates, and the two link pieces. The two blades are pivoted together by a first pivot, while the two actuating plates are pivoted together by a second pivot. The two blades are provided at a bottom end with a toothed portion, whereas the two actuating plates are provided at a top end with a toothed portion. The toothed portions of the blades and the actuating plates are similar in function to gears so as to effectuate as efficient transmission of force from the handles to the blades. As a result, the pruning efficiency of the present invention is greatly enhanced.

The two pivoting plates are provided with a projected portion extending therefrom and having a confinement through slot. The two link pieces are respectively fastened at one end to the two actuating plates and are pivoted together at the other end by a third pivot which is slidably confined in the confinement through slot. The two link pieces serve to balance and stabilize the two actuating plates in action.

The features, functions, and advantages of the present invention will be more readily understood upon a thoughtful deliberation of the following detailed description of a preferred embodiment of the present invention with reference to the accompanying drawings.

BRIEF DESCRIPTION OF THE SEVERAL VIEWS OF THE DRAWINGS combination.

DETAILED DESCRIPTION OF THE INVENTION

Figure 1:
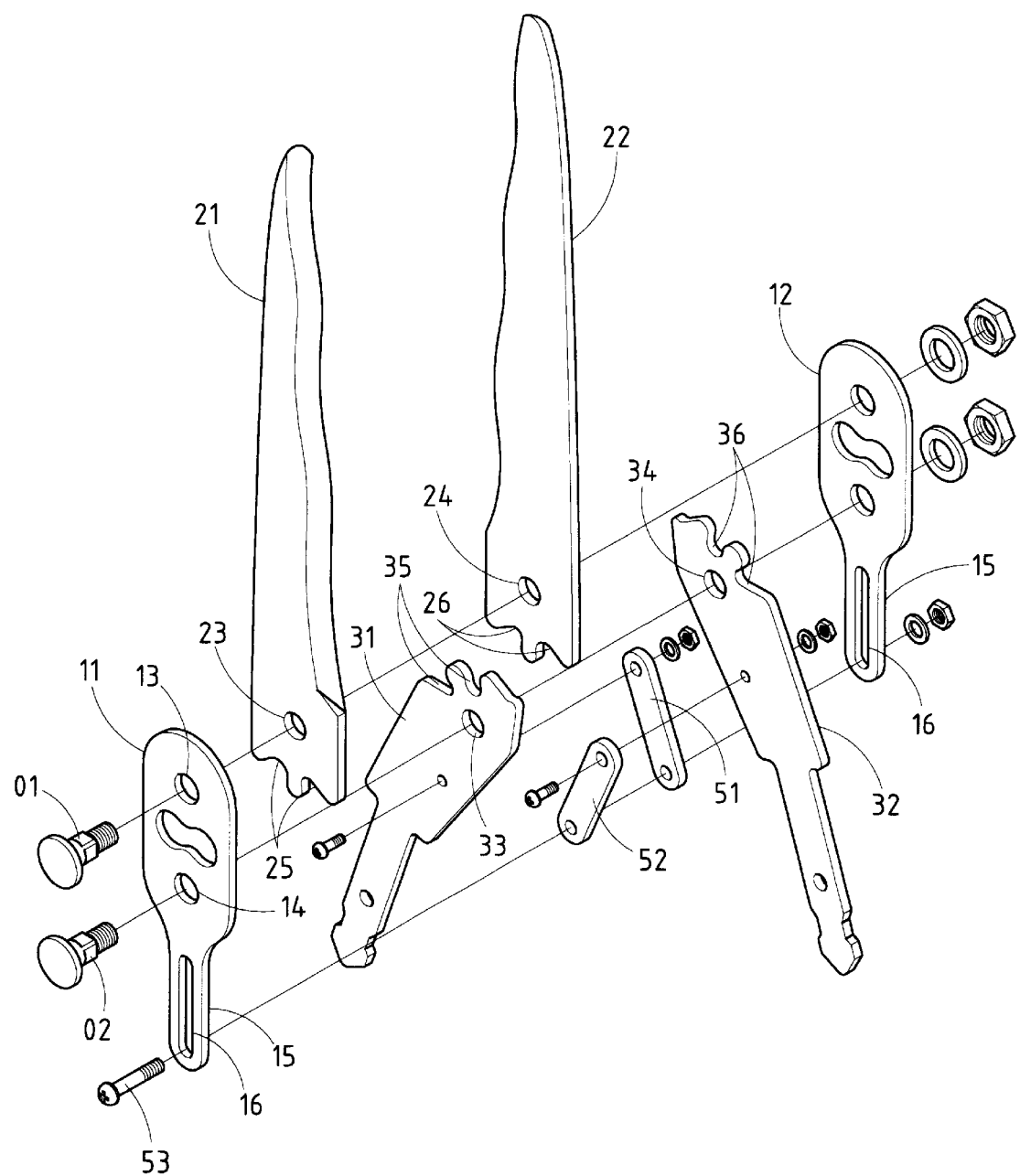
FIG. 1 shows an exploded perspective view of the preferred embodiment of the present invention.
Figure 2:
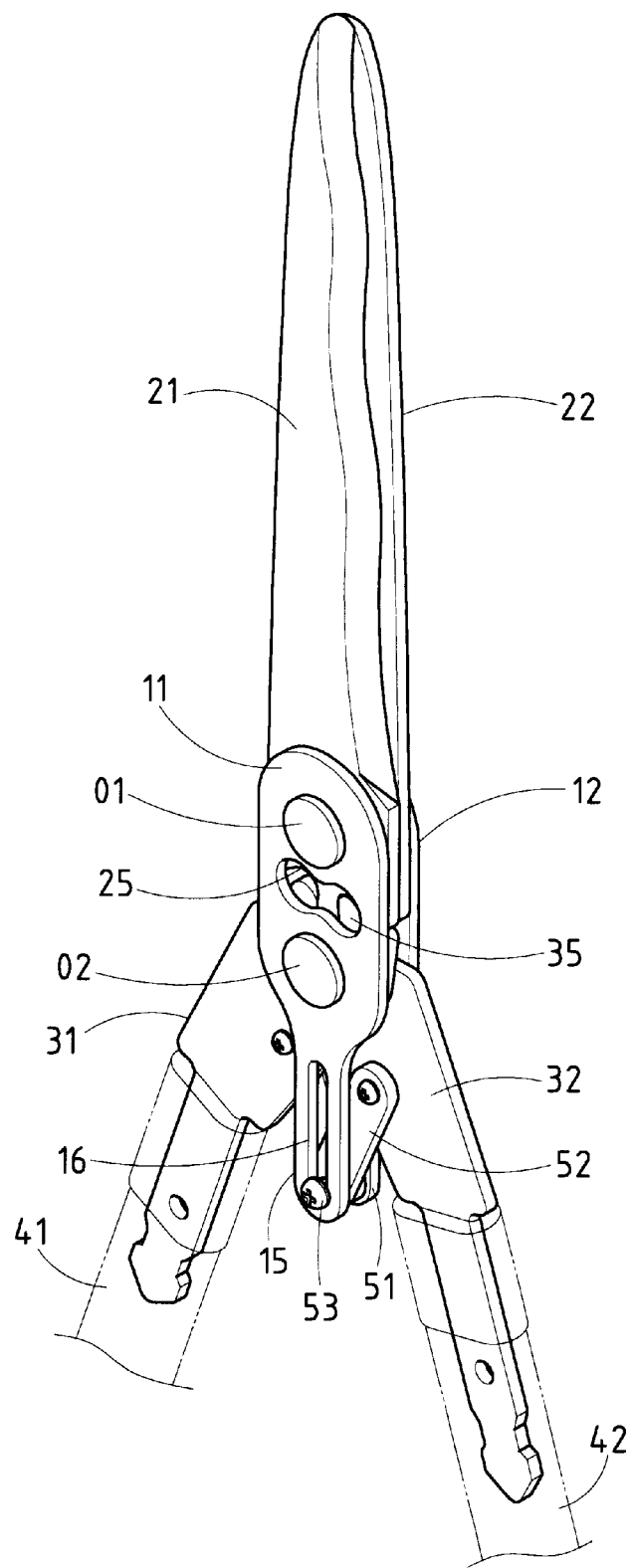
FIG. 2 shows a perspective view of the preferred embodiment of the present invention.

As shown in FIGS. 1–4, a gardening pruner embodied in the present invention comprises two pivoting plates 11 and 12, two blades 21 and 22, two actuating plates 31 and 32, and two handles 41 and 42.

The two pivoting plates 11 and 12 are identical in construction to each other and are provided with a first pivoting hole 13 and a second pivoting hole 14.

The first blade 21 is provided in proximity of a bottom end with a first through hole 23 corresponding in location to the first pivoting holes 13 of the two pivoting plates 11 and 12. The first blade 21 is further provided at the bottom end with a first toothed portion 25. Similarly, the second blade 22 is provided in proximity of a bottom end with a second through hole 24 corresponding in location to the first through hole 23 of the first blade 11 and the first pivoting holes 13 of the two pivoting plates 11 and 12. The second blade 22 is provided at the bottom end with a second toothed portion 26. The first blade 21 and the second blade 22 are pivoted together by a first pivot 01 which is put through the first pivoting holes 13 of the two pivoting plates 11 and 12, the first through hole 23 of the first blade 21, and the second through hole 24 of the second blade 22.

The first actuating plate 31 is fastened at a bottom end with a top end of the first handle 41 and is provided in proximity of a top end with a first through hole 33, and at the top end with a first toothed portion 35. The second actuating plate 32 is fastened at a bottom end with a top end of the second handle 42 and is provided in proximity of a top end with a second through hole 34 corresponding in location to the first through hole 33 of the first actuating plate 31. The second actuating plate 32 is further provided at the top end with a second toothed portion 36. The two actuating plates 31 and 32 are pivoted together by a second pivot 02 which is put through the second pivoting holes 14 of the two pivoting plates 11 and 12, the first through hole 33 of the first actuating plate 31, and the second through hole 34 of the second actuating plate 32. In the meantime, the first toothed portion 35 of the first actuating plate 31 is engaged with the first toothed portion 25 of the first blade 21, while the second toothed portion 36 of the second actuating plate 32 is engaged with the second toothed portion 26 of the second blade 22.

Figure 3:
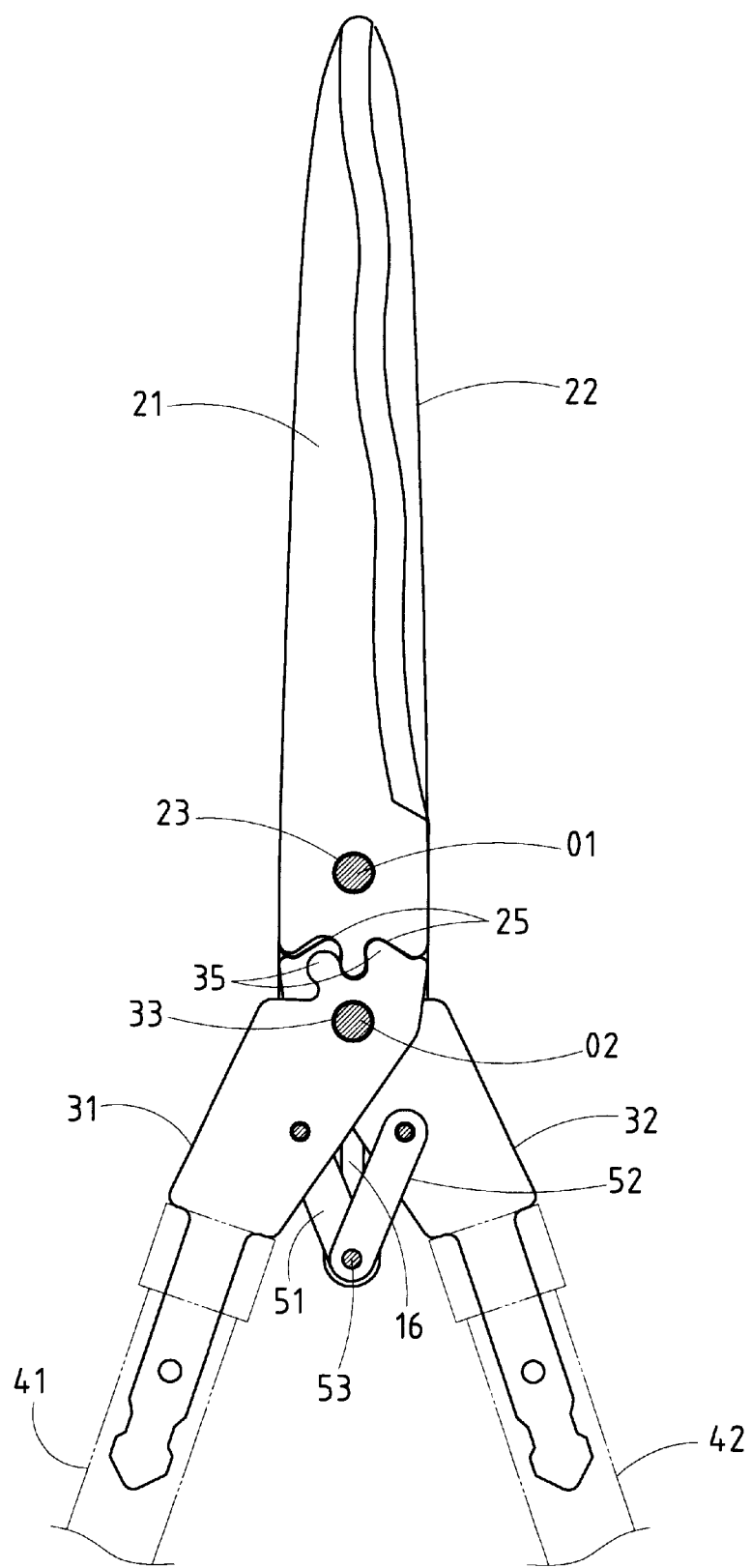
FIG. 3 shows a schematic plan view of the preferred embodiment of the present invention in a closed state.

When the two handles 41 and 42 are moved toward each other, as shown in FIG. 3, the two actuating plates 31 and 32 turn on the second pivot 02. In the meantime, the toothed portions 25 and 26 of the two blades 21 and 22 are actuated by the toothed portions 35 and 36 of the two actuating plates 31 and 32 to turn on the first pivot 01 so as to cause the two blades 21 and 22 to move toward each other to execute the cutting operation.

Figure 4:
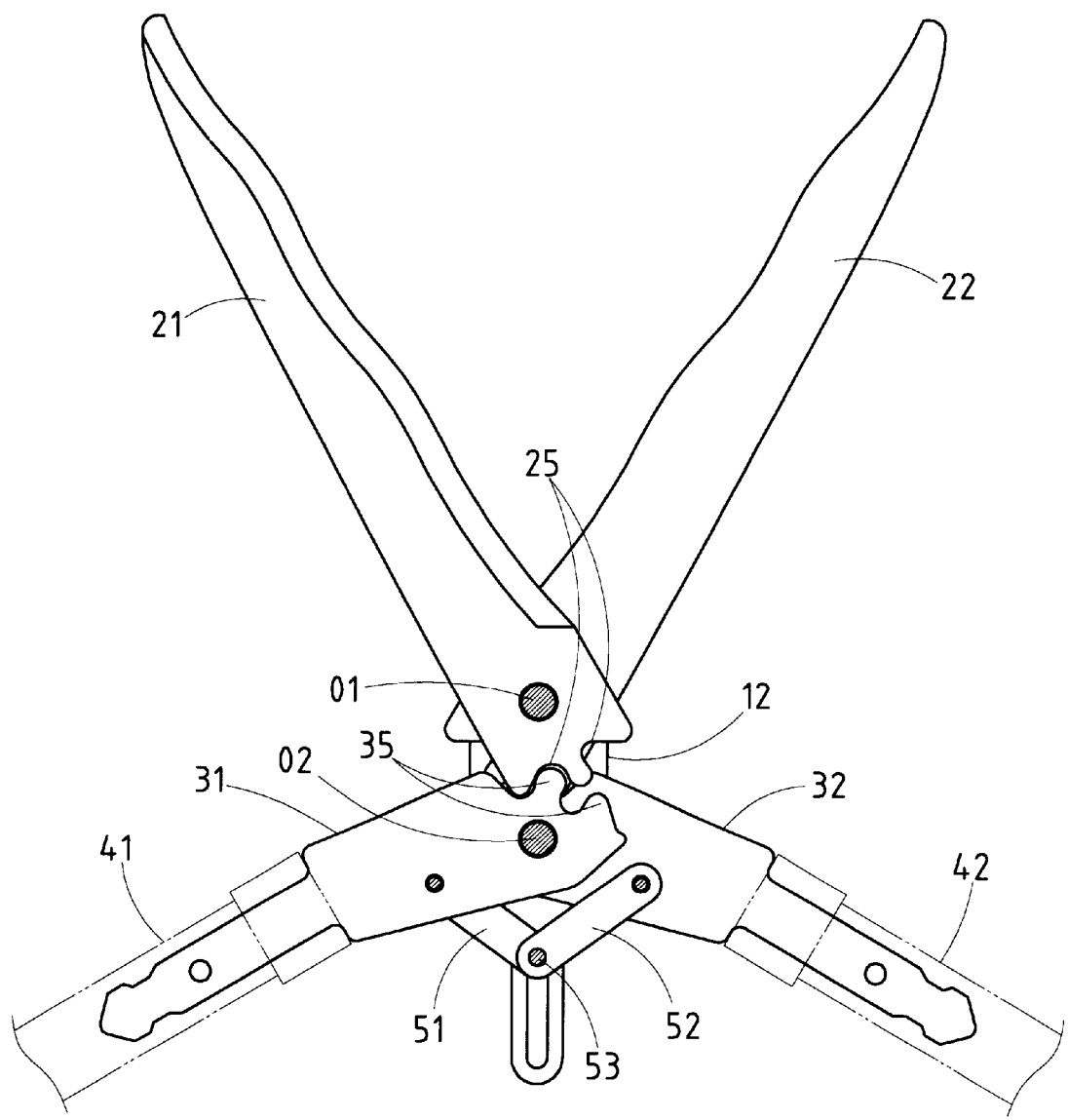
FIG. 4 shows a schematic plan view of the preferred embodiment of the present invention in an open state.

When the two handles 41 and 42 are moved away from each other, as shown in FIG. 4, the two actuating plates 31 and 32 turn on the second pivot 02. In the meantime, the toothed portions 25 and 26 of the two blades 21 and 22 are actuated by the toothed portions 35 and 36 of the two actuating plates 31 and 32 to turn on the first pivot 01 so as to cause the blades 21 and 22 to move away form each other to prepare for another cutting operation.

The two pivoting plates 11 and 12 are identically provided with a projected portion 15 which is in turn provided with a confinement through slot 16 of a predetermined length. A first link piece 51 is fastened at a top end with the first actuating plate 31. A second link piece 52 is fastened at a top end with the second actuating plate 32. The two link pieces 51 and 52 are pivoted together at a bottom end thereof by a third pivot 53 which is slidably put through the confinement through slots 16 of the projected portions 15 of the two pivoting plates 11 and 12. When the two blades 21 and 22 execute a cutting operation, the third pivot 53 is located at a bottom end of the confinement through slots 16, as shown in FIG. 3. When the two blades 21 and 22 are ready to execute another cutting operation, the third pivot 53 is located at a top end of the confinement through slots 161 as show in FIG. 4. The operation of the gardening pruner of the present invention is thus stabilized and balanced by the two link pieces 51 and 52 in conjunction with the third pivot 53 and the confinement through slots 16.

In light of the transmission of force from the handles 41 and 42 to the blades 21 and 22 being effected by a gear-type transmission in the form of the toothed portions 25, 35, 26, and 36, the gardening pruner of the present invention is relatively efficient.

The embodiment of the present invention described above is to be regarded in all respects as being illustrative and nonrestrictive. Accordingly, the present invention may be embodied in other specific forms without deviating from the spirit thereof. The present invention is therefore to be limited only by the scope of the following claims.

I claim:

1. A gardening pruner comprising:
   a first handle;
   a second handle;
   a first actuating plate fastened at a bottom end to a top end of said first handle, and comprised of, in proximity of a top end thereof, a first through hole and at the top end thereof, a first toothed portion;
   a second actuating plate fastened at a bottom end, a top end of said second handle, and comprised of, in proximity of a top end thereof, a second through hole and at the top end thereof, a second toothed portion;
   two pivoting plates identical in construction to each other and comprised of a bottom pivoting hole and a top pivoting hole, said two pivoting plates being pivoted together by a pivot along with said first actuating plate and said second actuating plate such that said two actuating plates are held between said two pivoting plates whereby said pivot is put through said bottom pivoting holes of said two pivoting plates and said through holes of said two actuating plates;
   a first blade comprised of, in proximity of a bottom end, a first through hole, and at the bottom end with a first toothed portion, said first blade being pivoted with one of said two pivoting plates by a pivot such that said first toothed portion of said first blade is engaged with said first toothed portion of said first actuating plate whereby said pivot is put through said top pivoting hole of said one pivoting plate and said first through hole of said first blade; and
   a second blade comprised of, in proximity of a bottom end, a second through hole, and at the bottom end, a second toothed portion, said second blade being pivoted with another one of said two pivoting plates by said pivot of said first blade and said one pivoting plate such that said second toothed portion of said second blade is engaged with said second toothed portion of said second actuating plate whereby said pivot is put through said second through hole of said second blade and said top pivoting hole of said other one pivoting plate.

2. The gardening pruner as defined in claim 1, wherein said two pivoting plates are comprised of, at a bottom end, a projected portion extending therefrom and having a confinement through slot of a length; wherein said first actuating plate is comprised of a first link piece which is fastened at a top end, said first actuating plate; wherein said second actuating plate is comprised of a second link piece which is fastened at a top end to said second actuating plate; wherein said projected portions of said two pivoting plates are pivoted with a bottom end of said first link piece and a bottom end of said second link piece by a pivot whereby said pivot is slidably received in said confinement through slots of said projected portions of said two pivoting plates.

* * * * *